(12) United States Patent
Asakawa

(10) Patent No.: US 11,249,695 B2
(45) Date of Patent: Feb. 15, 2022

(54) IMAGE FORMING APPARATUS AND IMAGE FORMING SYSTEM

(71) Applicant: Konica Minolta, Inc., Tokyo (JP)

(72) Inventor: Minoru Asakawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/872,669

(22) Filed: May 12, 2020

(65) Prior Publication Data

US 2021/0004183 A1  Jan. 7, 2021

(30) Foreign Application Priority Data

Jul. 5, 2019 (JP) .............................. JP2019-125906

(51) Int. Cl.
*G06F 3/12* (2006.01)

(52) U.S. Cl.
CPC ............ *G06F 3/1205* (2013.01); *G06F 3/121* (2013.01); *G06F 3/1204* (2013.01); *G06F 3/1255* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,727,333 | B2 * | 5/2014 | Ohmiya ............. | G03G 15/6529 271/9.01 |
| 2008/0170262 | A1 * | 7/2008 | Takahashi .......... | H04N 1/00411 358/1.15 |
| 2009/0116067 | A1 * | 5/2009 | Miyajima .......... | G03G 15/6538 358/1.16 |
| 2014/0211277 | A1 * | 7/2014 | Ozaki ................ | H04N 1/00588 358/496 |
| 2014/0307291 | A1 * | 10/2014 | Asakawa ........... | G06K 15/1868 358/1.15 |
| 2018/0134509 | A1 * | 5/2018 | Yamakawa ........ | G03G 15/6552 |

FOREIGN PATENT DOCUMENTS

JP 2018-077753 A 5/2018

* cited by examiner

*Primary Examiner* — Helen Zong
(74) *Attorney, Agent, or Firm* — Lucas & Mercanti, LLP

(57) ABSTRACT

There is provided an image forming apparatus that improves the operability in selection of a post-processing function. The image forming apparatus is configured as follows: the controller of the apparatus includes an operation control section and a job management control section; the operation control section receives, from an operation section, registration of information on a post-processing member to be used in a post-processing device, stores the registration information on the post-processing member in a storage section, and displays a post-processing function selectable in setting a job on a display section according to the registration information; and the job management control section acquires setting information which indicates the post-processing function selected on a setting screen displayed on the display section for the job.

12 Claims, 12 Drawing Sheets

| Type | FUNCTION | CAN BE INSTALLED IN: |
|---|---|---|
| A | CD CUTTING (CD CUTTING FUNCTION) | SLOT4 |
| B | CD PERFORATING (PERFORATING FUNCTION) | SLOT2 |
| C | FD PERFORATING (PERFORATING FUNCTION) | SLOT3 |
| D | TOP-BOTTOM SLITTING (FD CUTTING FUNCTION) | SLOT1 |
| E | MIDDLE SLITTING (FD CUTTING FUNCTION) | SLOT3 |
| F | CREASING (CREASING FUNCTION) | SLOT2/3 |

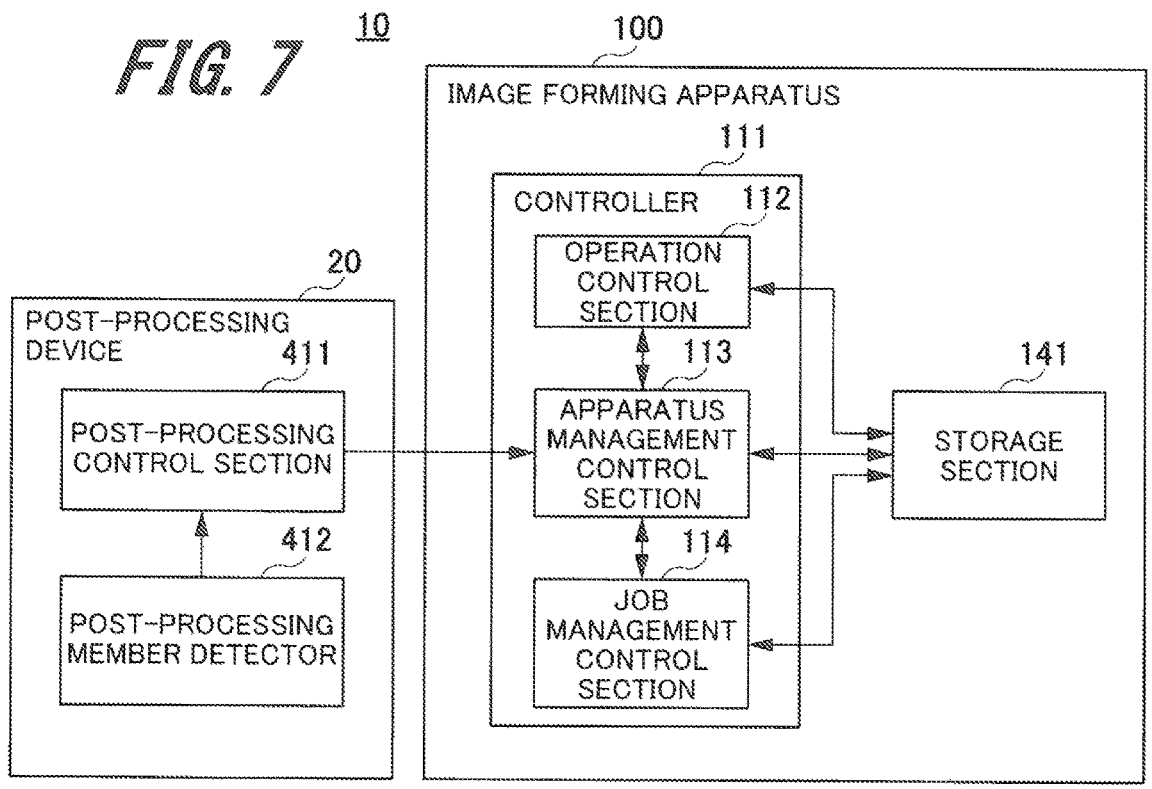

FIG. 9

| REGISTRATION OF POST-PROCESSING MEMBERS | | |
|---|---|---|
| Type-A (CD CUTTING) | REGISTER ON | REGISTER OFF |
| Type-B (CD PERFORATING) | REGISTER ON | REGISTER OFF |
| Type-C (FD PERFORATING) | REGISTER ON | REGISTER OFF |
| Type-D (TOP-BOTTOM SLITTING) | REGISTER ON | REGISTER OFF |
| Type-E (MIDDLE SLITTING) | REGISTER ON | REGISTER OFF |
| Type-F (CREASING) | REGISTER ON | REGISTER OFF |

FIG. 10

| REGISTRATION OF POST-PROCESSING MEMBERS | | |
|---|---|---|
| Type-A (CD CUTTING) | REGISTER ON | REGISTER OFF |
| Type-B (CD PERFORATING) | REGISTER ON | REGISTER OFF |
| Type-C (FD PERFORATING) | REGISTER ON | REGISTER OFF |
| Type-D (TOP-BOTTOM SLITTING) | REGISTER ON | REGISTER OFF |
| Type-E (MIDDLE SLITTING) | REGISTER ON | REGISTER OFF |
| Type-F (CREASING) | REGISTER ON | REGISTER OFF |

FIG. 11

| REGISTRATION OF POST-PROCESSING MEMBERS | | |
|---|---|---|
| Type-A (CD CUTTING) | REGISTER ON | REGISTER OFF |
| Type-B (CD PERFORATING) | REGISTER ON | REGISTER OFF |
| Type-C (FD PERFORATING) | REGISTER ON | REGISTER OFF |
| Type-D (TOP-BOTTOM SLITTING) | REGISTER ON | REGISTER OFF |
| Type-E (MIDDLE SLITTING) | REGISTER ON | REGISTER OFF |
| Type-F (CREASING) | REGISTER ON | REGISTER OFF |

FIG. 16

| SELECTION OF MULT-CUTTING MACHINE FUNCTIONS | | | | | |
|---|---|---|---|---|---|
| CUTTING FUNCTIONS | CD CUTTING | ON | OFF | DETAIL | |
| | FD CUTTING 1 | ON | OFF | DETAIL | |
| | FD CUTTING 2 | ON | OFF | DETAIL | |
| PERFORATING FUNCTIONS | CD PERFORATING | ON | OFF | DETAIL | |
| | FD PERFORATING | ON | OFF | DETAIL | |
| SLITTING FUNCTION | CD SLITTING | ON | OFF | DETAIL | |

FIG. 17

| SELECTION OF MULT-CUTTING MACHINE FUNCTIONS | | | | | |
|---|---|---|---|---|---|
| CUTTING FUNCTIONS | CD CUTTING | ON | OFF | DETAIL | |
| | FD CUTTING 1 | ON | OFF | DETAIL | |
| | FD CUTTING 2 | ON | OFF | DETAIL | |
| PERFORATING FUNCTIONS | CD PERFORATING | ON | OFF | DETAIL | |
| | FD PERFORATING | ON | OFF | DETAIL | |
| SLITTING FUNCTION | CD SLITTING | ON | OFF | DETAIL | |

FIG. 18

| SELECTION OF MULT-CUTTING MACHINE FUNCTIONS | | | | | |
|---|---|---|---|---|---|
| CUTTING FUNCTIONS | CD CUTTING | ON | OFF | DETAIL | |
| | FD CUTTING 1 | ON | OFF | DETAIL | |
| | FD CUTTING 2 | ON | OFF | DETAIL | |
| PERFORATING FUNCTIONS | CD PERFORATING | ON | OFF | DETAIL | |
| | FD PERFORATING | ON | OFF | DETAIL | |
| SLITTING FUNCTION | CD SLITTING | ON | OFF | DETAIL | |

FIG. 19

| JOB | COMBINATION OF SLOTS | MESSAGE |
|---|---|---|
| J4 | Type-A/D/E/F | INSTALL TYPE B IN SLOT 2 AND TYPE C IN SLOT 3 |

FIG. 20

| JOB | COMBINATION OF SLOTS | MESSAGE |
|---|---|---|
| J5 | Type-A/B/C/D/E | INSTALL TYPE F IN SLOT 6 |

IMAGE FORMING APPARATUS AND IMAGE FORMING SYSTEM

CROSS-REFERENCE TO RELATED APPLICATIONS

The entire disclosure of Japanese Patent Application No. 2019-125906, filed on Jul. 5, 2019, is incorporated herein by reference in its entirety.

BACKGROUND

Technological Field

The present invention relates to an image forming apparatus and an image forming system.

Description of the Related Art

In the printing market, image forming systems are used which perform various types of post-processing for a sheet of paper on which an image is formed by an image forming apparatus, using a post-processing device. For example, a post-processing device has various post-processing functions such as paper cutting, paper creasing, stapling, and punching. Recently, along with the diversification of post-processing functions, an image forming system has been proposed which can expand the post-processing capability by replacement of post-processing members without fixing the post-processing functions which one post-processing device performs (for example, see Patent Literature 1 (JP-A-2018-77753)).

In an image forming system in which post-processing members can be replaced, when the user sets a job, the user may select a post-processing function which uses a post-processing member not installed in the post-processing device. In the image forming apparatus described in Patent Literature 1, if a post-processing function which the post-processing device cannot perform is selected, the job is not started or the job is cancelled.

CITATION LIST

Patent Literature

Patent Literature 1: JP-A-2018-77753

SUMMARY

In the control method adopted by the image forming system described in Patent Literature 1, all the post-processing functions of the system can be selected to set a job on the premise that post-processing members may be replaced. In this method, however, if a post-processing function which cannot be performed is selected for the job, the job is stopped or cancelled, which is inconvenient for the user. On the other hand, if only the post-processing functions that can be performed are selectable at the time of setting a job, the user cannot select the desired post-processing functions if he/she wishes to start the job with the intention of replacing post-processing members after setting the job or during execution of the job, so the operability is low for the user.

Therefore, the need exists for an image forming apparatus and an image forming system that can improve the operability in selection of post-processing functions by the user, regardless of whether post-processing members are installed or not.

In order to solve the above problem, there is provided an image forming apparatus and an image forming system that can improve the operability in selection of post-processing functions by the user, regardless of whether post-processing members are installed or not.

To achieve the above object, according to an aspect of the present invention, an image forming apparatus reflecting one aspect of the present invention comprises a display section, an operation section, a controller, a storage section, and an image forming section for forming an image on paper. The controller comprises an operation control section and a job management control section. The operation control section receives, from the operation section, registration of information on a post-processing member to be used in a post-processing device to perform post-processing for the paper with an image formed thereon, stores the registration information on the post-processing member in the storage section, and displays a post-processing function selectable in setting a job on the display section according to the registration information. The job management control section acquires setting information which indicates the post-processing function selected on a setting screen displayed on the display section for the job.

According to another aspect of the present invention, an image forming system reflecting one aspect of the present invention comprises an image forming apparatus and a post-processing device for performing post-processing for paper. The image forming apparatus comprises a display section, an operation section, a controller, a storage section, and an image forming section for forming an image on paper. The controller comprises an operation control section and a job management control section. The operation control section receives, from the operation section, registration of information on a post-processing member to be used in the post-processing device, stores the registration information on the post-processing member in the storage section, and displays a post-processing function selectable in setting a job on the display section according to the registration information. The job management control section acquires setting information which indicates the post-processing functions selected on a setting screen displayed on the display section for the job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a functional block diagram of the image forming system related to registration of user-selectable post-processing functions;

FIG. 8 is a diagram which explains an example of manual registration of selectable post-processing functions by the user;

FIG. 9 shows an example of the setting screen to register the post-processing functions displayed on an operation display unit;

FIG. 10 shows an example of the setting screen to register the post-processing functions displayed on the operation display unit;

FIG. 11 shows an example of the setting screen to register the post-processing functions displayed on the operation display unit;

FIG. 16 shows an example of the job setting screen displayed on the operation display unit;

FIG. 17 shows an example of the job setting screen displayed on the operation display unit;

FIG. 18 shows an example of the job setting screen displayed on the operation display unit;

FIG. 19 shows an example of an error message displayed on the operation display unit; and FIG. 20 shows an example of an error message displayed on the operation display unit.

DETAILED DESCRIPTION OF EMBODIMENTS

Hereinafter, an embodiment of the present invention will be described with reference to the drawings. However, the scope of the invention is not limited to the disclosed embodiment.

(Embodiment of the Image Forming System)

Next, an image forming system according to an embodiment of the present invention will be described.

Figure 1:
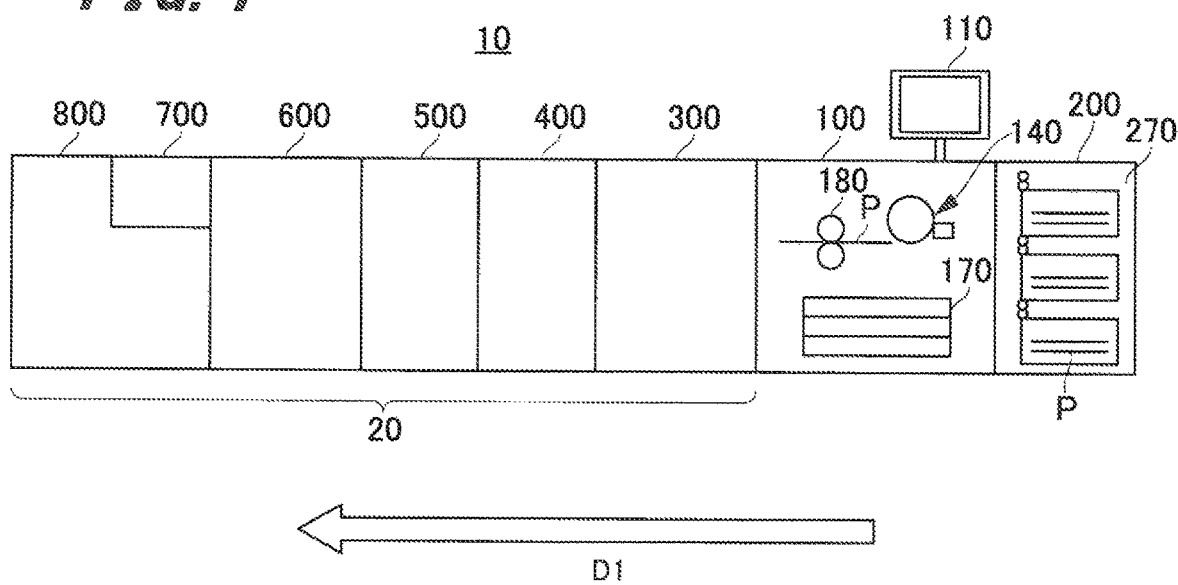
FIG. 1 shows the general configuration of an image forming system.

FIG. 1 shows the general configuration of an image forming system 10. The image forming system 10 includes an image forming apparatus 100, a large-capacity paper feed unit 200, and a post-processing device 20 including a plurality of post-processing units. The units are connected along the paper transportation direction D1. In the image forming system 10, post-processing members are installed in the post-processing device 20 in a replaceable manner.

[Structure of the Image Forming Apparatus]

In the image forming system 10, the image forming apparatus 100 includes an operation display unit 110, an image forming section 140, a paper feed section 170, and a fixing section 180. Since a known image forming apparatus can be used for the image forming apparatus 100, a detailed description of the structure of the image forming apparatus 100 is omitted here.

In the image forming apparatus 100, the operation display unit 110 is installed on the upper surface of the casing of the image forming apparatus 100 and has a touch panel which enables touch interactions, such as an LCD (Liquid Crystal Display), and a hard keyboard including numeral keys, a start button and other various buttons. The operation display unit 110 enables the user to enter image forming conditions such as paper size and a paper feed tray, and conditions of processing by the post-processing device 20. Also, it displays the condition of the image forming system 10 for notification to the user and many kinds of information such as the conditions of components.

The paper feed section 170 has a plurality of paper feed trays which house various types of paper P such as A4 and A3 sheets. When the command to start the image forming process is selected on the operation display unit 110 or the like, the paper feed section 170 picks up paper P from a paper feed tray through a pickup roller, separation roller or the like. Then, the picked paper P is transported to the image forming section 140 sheet by sheet by conveyor rollers or the like.

The image forming section 140 includes an electrifying section, a photoreceptor, an exposure section, and a development section, though not shown in the figure. After electric charge is applied to the photoreceptor by the electrifying section, the exposure section irradiates laser light to form an electrostatic latent image on the photoreceptor. Then, the development section makes the electrostatic latent image appear on the surface of the photoreceptor to form a toner image. Then, the toner image is transferred to an intermediate transfer belt and the transferred toner image on the intermediate transfer belt is transferred to the surface of the sheet of paper P transported at a given timing. The sheet of paper on which the image has been transferred is transported to the fixing section 180 located downstream of the image forming section 140 in the paper transportation direction D1.

For example, the fixing section 180 includes a pressure roller, a fixing roller, a belt and the like to fix the toner image on the sheet of paper P by heating and pressurizing the sheet of paper P transported from the image forming section 140. The sheet of paper P subjected to the fixing process by the fixing section 180 is transported toward the post-processing device 20 specified by the user.

[System Block Diagram of the Image Forming Apparatus]

Figure 2:
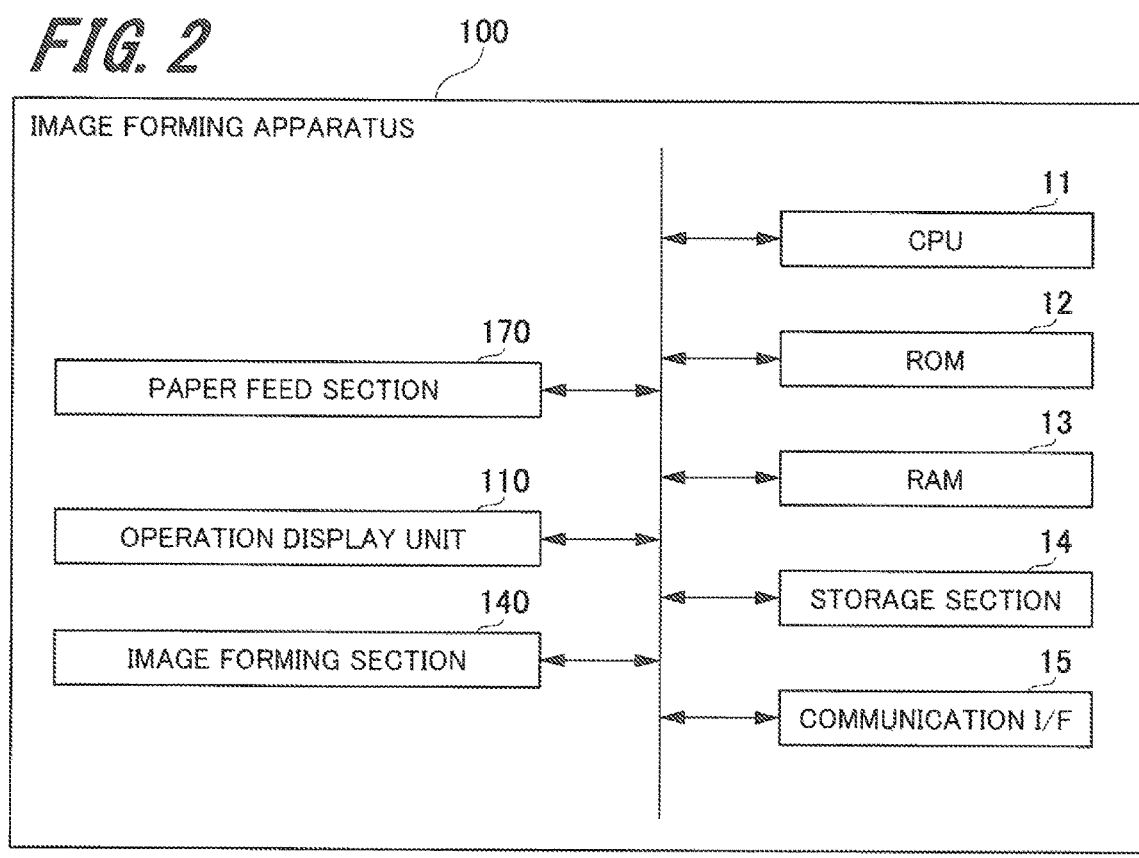
FIG. 2 is a system block diagram of an image forming apparatus.

FIG. 2 is a system block diagram of the image forming apparatus 100.

The image forming apparatus 100 includes a CPU (Central Processing Unit) 11, a ROM (Read Only Memory) 12, a RAM (Random Access Memory) 13, a storage section 14, and a communication I/F (Interface) 15 as well as the paper feed section 170, operation display unit 110, and image forming section 140. The various sections in the image forming apparatus 100 are connected by a bus.

The CPU 11 (an example of a control section) is used as an example of a computer which controls operation of the various sections in the image forming apparatus 100. For example, the CPU 11 controls the image forming process (printing operation) by the image forming section 140 according to the printing instruction given by the user through the operation display unit 110, controls the supply of sheets of paper P by the paper feed section 170, and performs image data objectification or other processes. The CPU 11 receives the job set by the user and registration of post-processing functions using the post-processing device, etc. from the operation display unit 110.

The ROM 12 is used as an example of a nonvolatile memory and stores the program and data, etc. which the CPU 11 executes and refers to.

The RAM 13 is used as an example of a volatile memory and temporarily stores the information (data) required for various types of processing which the CPU 11 performs.

The storage section 14 is, for example, a storage unit such as an HDD (Hard Disk Drive) and stores the program for the CPU 11 to control the various sections, an OS (Operating System), a program such as a controller, and data. The program and part of the data which are stored in the storage section 14 may be stored in the ROM 12. The storage section 14 is used as an example of a non-transitory computer-readable recording medium storing the program to be executed by the CPU 11. The non-transitory computer-readable recording medium storing the program to be executed by the image forming apparatus 100 is not limited to an HDD, but instead it may be another type of recording medium such as an SSD (Solid State Drive), CD-ROM or DVD-ROM.

The communication I/F 15 is a NIC (Network Interface Card), modem or the like and establishes the connection with the post-processing device 20 and a PC terminal (not shown) to transmit and receive various data.

[Structure of the Large-Capacity Paper Feed Unit]

In the image forming system 10, the large-capacity paper feed unit 200 (FIG. 1) is connected on the upstream side of the image forming apparatus 100 in the paper transportation direction D1 and houses, in a casing, a paper feed section 270 which includes a plurality of stages of paper feed trays to house a large volume of paper P. The paper feed section 270 houses sheets of paper P of the same size and different sizes. The large-capacity paper feed unit 200 includes a blower, a suction conveyor, conveyor rollers and the like, though not shown in the figure. As the printing process is started, the sheets specified by the printing job are separated and taken out of the paper feed tray, sheet by sheet, by the blower, suction conveyor, etc. and transported upstream to the image forming apparatus 100 through the conveyor rollers, etc. When the paper P in the paper feed section 270 currently in use is exhausted, the paper feed section 270 is switched to another paper feed section 270 housing sheets of paper P of the same size to continue supplying sheets of paper. In this example, the image forming system 10 is assumed to be provided with one large-capacity paper feed unit 200, but the number of large-capacity paper feed units 200 is not limited to this and the system may be provided with two or more large-capacity paper feed units 200.

[Structure of the Post-Processing Device]

In the image forming system 10, the post-processing device 20 includes post-processing units 300, 400, 500, 600, 700, and 800. The post-processing units 300, 400, 500, 600, 700, and 800 are, for example, a multi-cutting machine, a curl correction machine, a double-sheeting machine, a stacking machine, a casing-in bookbinding machine, a punch unit, a side stitching machine and the like. The post-processing units 300, 400, 500, 600, 700, and 800 can be each used independently or some of them can be used in combination.

[System Block Diagram of the Post-Processing Device]

Figure 3:
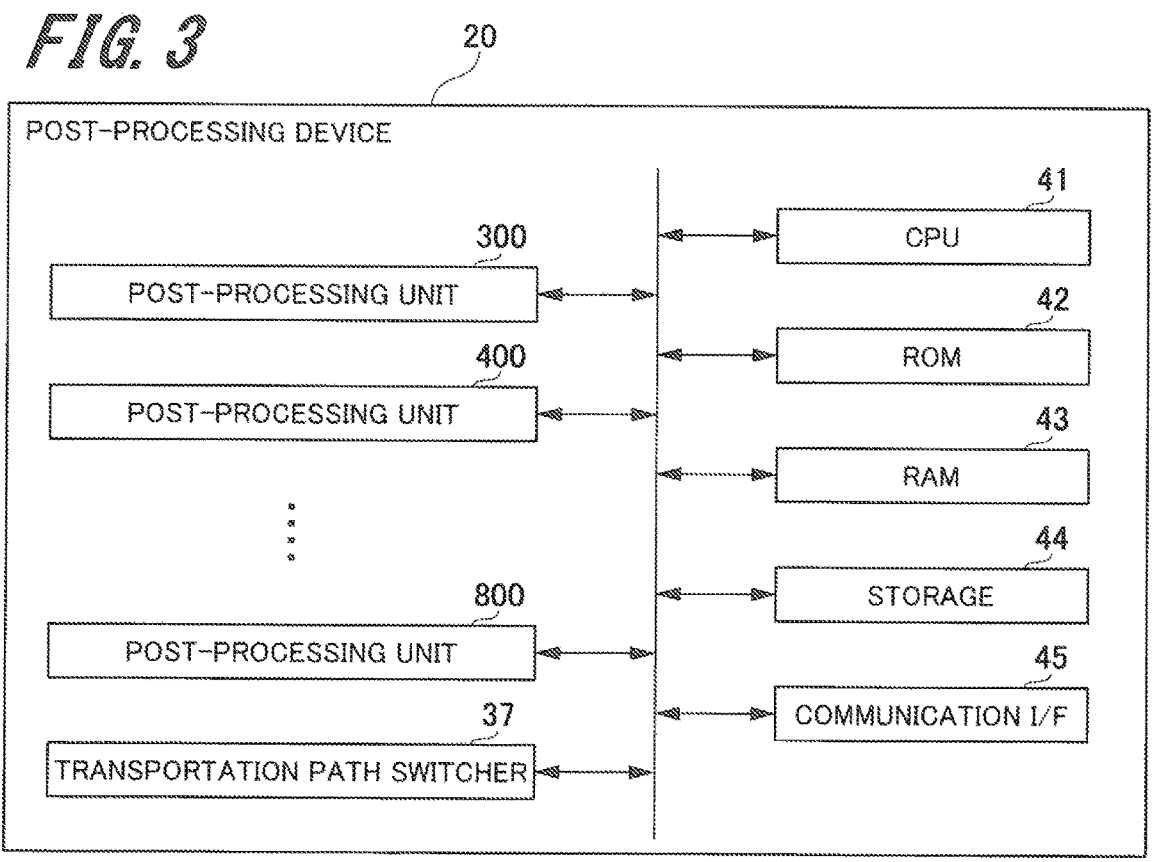
FIG. 3 is a system block diagram of a post-processing device.

FIG. 3 is a system block diagram of the post-processing device 20.

The post-processing device 20 includes the above post-processing units 300, 400, 500, 600, 700, and 800, a CPU 41, a ROM 42, a RAM 43, a storage 44, a communication I/F 45, and a transportation path switcher 37. The various sections in the post-processing device 20 are connected by a bus.

The CPU 41 (an example of a control section) is used as an example of a computer which controls operation of the various sections in the post-processing device 20. For example, the CPU 41 has the function to control post-processing operation of the post-processing units 300, 400, 500, 600, 700, and 800. Also, the CPU 41 detects whether the post-processing member to be installed in each of the post-processing units 300, 400, 500, 600, 700, and 800 has been installed or not (attached or detached) and the type and function, etc. of the installed post-processing member.

The ROM 42 is used as an example of a nonvolatile memory and stores the program and data, etc. which the CPU 41 executes and refers to.

The RAM 43 is used as an example of a volatile memory and temporarily stores the information (data) required for various types of processing which the CPU 41 performs.

The storage 44 is, for example, an HDD and stores the program for the CPU 41 to control the various sections, an OS, a program such as a controller, and data. The program and part of the data which are stored in the storage 44 may be stored in the ROM 42. The storage 44 is used as an example of a non-transitory computer-readable recording medium storing the program to be executed by the CPU 41. The non-transitory computer-readable recording medium storing the program to be executed by the post-processing device 20 is not limited to an HDD, but instead it may be another type of recording medium such as an SSD (Solid State Drive), CD-ROM or DVD-ROM.

The communication I/F 45 is a NIC, modem or the like and establishes the connection with the image forming apparatus 100 to transmit and receive various data. For example, the communication I/F 45 transmits the information about whether the post-processing member to be installed in each of the post-processing units 300, 400, 500, 600, 700, and 800 has been installed or not (attached or detached) or the type or function of the installed post-processing member, to the image forming apparatus 100. If the post-processing device 20 is used independently, the communication I/F 45 establishes the connection with the PC terminal (not shown) and transmits and receives various data.

The transportation path switcher 37 changes the transportation path for the paper P to pass through the post-processing device 20, among the post-processing units 300, 400, 500, 600, 700, and 800.

If the post-processing device 20 is in-line connected with the image forming apparatus 100, the various functions to be performed by the post-processing device 20 may be performed using the CPU 11, ROM 12, RAM 13, and storage section 14 of the image forming apparatus 100. Therefore, the post-processing device 20 may be structured without the CPU 41, ROM 42, RAM 43, and storage 44. On the other hand, if the post-processing device 20 is offline with respect to the image forming apparatus 100, the post-processing device 20 must perform control by itself and thus requires the CPU 41, ROM 42, RAM 43, and storage 44.

[Structure of the Post-Processing Device; Multi-Cutting Machine]

Figures 4, 5:
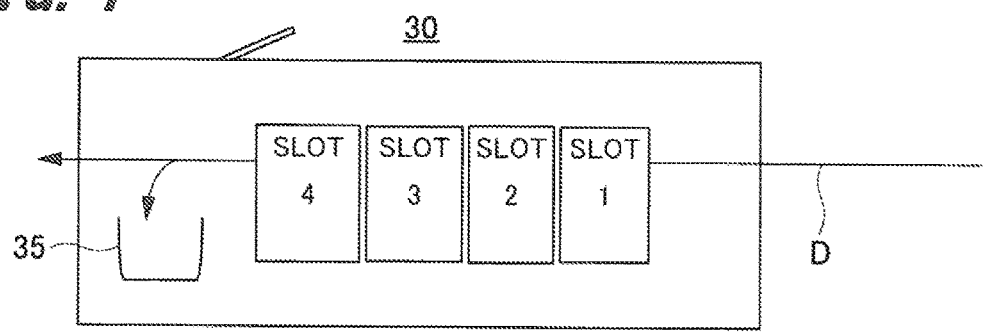
FIG. 4 shows the general structure of a multi-cutting machine as an example of a post-processing unit.
FIG. 5 shows an example of post-processing members which can be installed in the slots of the multi-cutting machine.

As one example of the post-processing units 300, 400, 500, 600, 700, and 800 which constitute the post-processing device 20, a multi-cutting machine is explained below. FIG. 4 shows the general structure of the multi-cutting machine. In a multi-cutting machine 30 shown in FIG. 4, a transportation path D to transport a sheet of paper P and slots 1 to 4 in which post-processing members are installed to perform specified post-processing operation for the sheet of paper P transported through the transportation path D are arranged in order from upstream to downstream in the transportation path D. In addition, a card tray 35 which serves as the delivery destination for sheets of paper P, etc. is installed downstream of the slots 1 to 4 in the transportation direction. Transportation of sheets of paper P to the slots 1 to 4 and card tray 35 in the multi-cutting machine 30 is controlled by the transportation path switcher 37.

FIG. 5 shows an example of post-processing members which can be installed in the slots 1 to 4 of the multi-cutting machine 30. FIG. 5 indicates the type of post-processing member (Type), the post-processing function which each type can perform, and the slot position (slot number) in the multi-cutting machine 30 in which the post-processing member can be installed. The type of post-processing member (Type) is designated by the name or symbol to identify the post-processing member or the model number of the post-processing member or the like. In FIG. 5, the type is expressed as Type A to Type F. In the column which indicates the post-processing function which can be performed, the post-processing functions which the post-processing members of Type A to Type F can perform are listed.

Figure 6A:
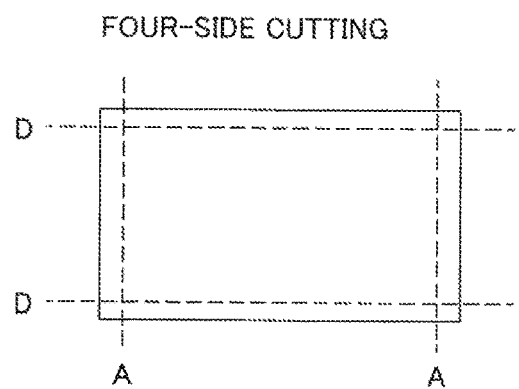
FIG. 6A shows an example of post-processing functions which use the multi-cutting machine.

FIGS. 6A to 6F show examples of post-processing functions which use the multi-cutting machine 30. By combining the above post-processing members of Type A to Type F, various cutting patterns can be achieved as shown in FIG. 6A to FIG. 6F. FIG. 6A shows the processing pattern achieved by the post-processing device for a job set to cut the four sides of a sheet. First, cutting is performed (at two positions) along the paper transportation direction indicated by broken line D using the Type D member (top-bottom slitting member). Then, cutting is performed (at two positions) along the direction perpendicular to the paper transportation direction as indicated by broken line A, using the Type A member (CD cutting member). The four sides of the sheet can be thus cut by the post-processing device.

Figure 6B:
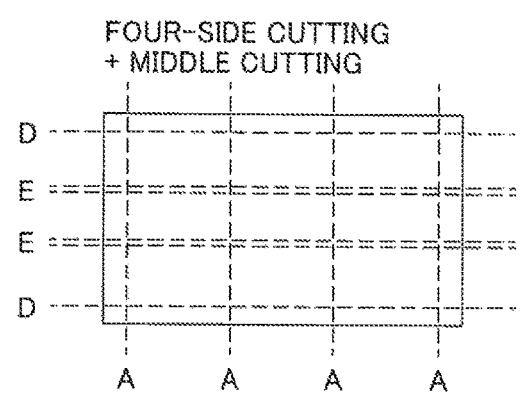
FIG. 6B shows an example of post-processing functions which use the multi-cutting machine.
Figure 6C:
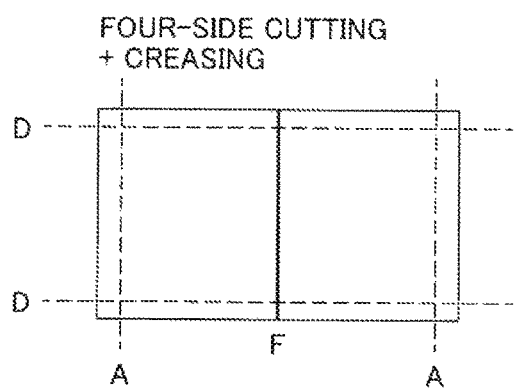
FIG. 6C shows an example of post-processing functions which use the multi-cutting machine.
Figure 6D:
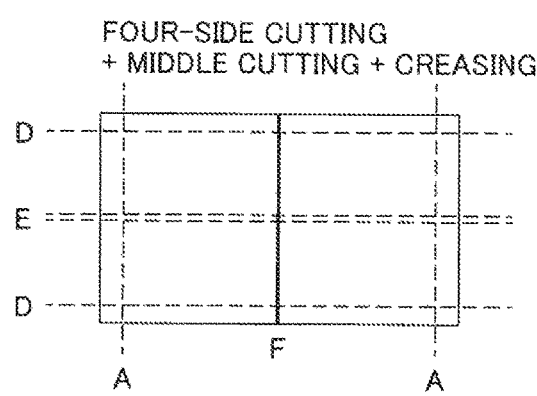
FIG. 6D shows an example of post-processing functions which use the multi-cutting machine.
Figure 6E:
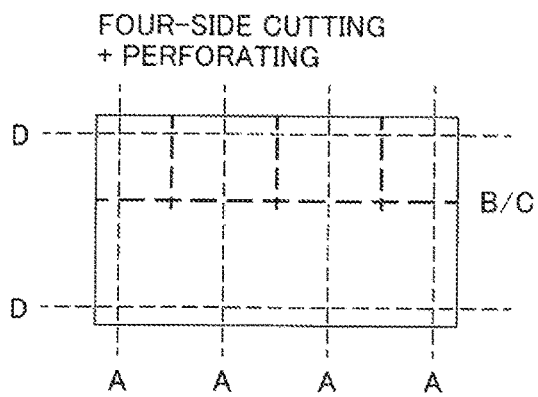
FIG. 6E shows an example of post-processing functions which use the multi-cutting machine.
Figure 6F:
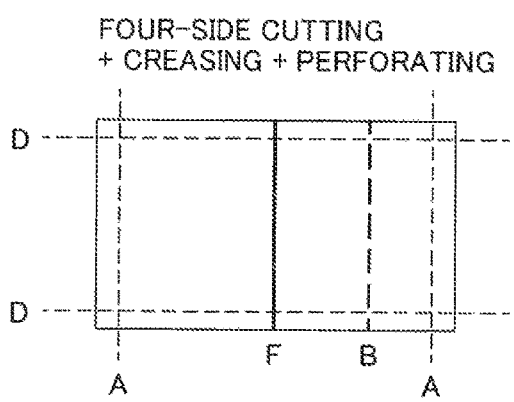
FIG. 6F shows an example of post-processing functions which use the multi-cutting machine.

Like the post-processing pattern shown in FIG. 6A, the post-processing patterns shown in FIG. 6B to FIG. 6F can be achieved as specified by each job by performing cutting and perforating as indicated by broken lines A to E using a combination of the post-processing members of Type A to Type E and creasing as indicated by solid line F using the post-processing member of Type F. FIG. 6B shows an example of a post-processing pattern on a sheet of paper P by combination of four-side cutting (Type A and Type D) and middle cutting (Type A and Type E). FIG. 6C shows an example of a post-processing pattern on a sheet of paper P by combination of four-side cutting (Type A and Type D) and creasing (Type F). FIG. 6D shows an example of a post-processing pattern on a sheet of paper P by combination of four-side cutting (Type A and Type D), middle cutting (Type E), and creasing (Type F). FIG. 6E shows an example of a post-processing pattern on a sheet of paper P by combination of four-side cutting (Type A and Type D), middle cutting (Type A), and perforating (Type B and Type C). FIG. 6F shows an example of a post-processing pattern on a sheet of paper P by combination of four-side cutting (Type A and Type D), creasing (Type F), and perforating (Type B).

[Registration of Post-Processing Functions]

In the image forming system 10, information on post-processing functions can be previously registered in the image forming apparatus 100 so as to limit the post-processing functions selectable when the user sets a job using the operation display unit 110. For example, in the image forming apparatus, the job setting screen shows specific selectable post-processing functions according to the information on the previously registered post-processing functions (hereinafter, registration information) so that the user can select whether to enable or disable each of the post-processing functions. Furthermore, the image forming apparatus hides a non-selectable post-processing function or shows it in a manner so that the user cannot select whether to enable or disable it.

In the image forming system 10, the user can previously register the post-processing functions which the user can select whether to enable or disable and the post-processing functions which the user cannot select whether to enable or disable, in the image forming apparatus 100. Alternatively, the controller of the image forming apparatus 100 may register the information on the post-processing functions to be selectable and the post-processing functions to be hidden or non-selectable, according to the record of the post-processing members installed in the post-processing device.

FIG. 7 is a functional block diagram of the image forming system 10 related to registration of post-processing functions. As shown in FIG. 7, the image forming system 10 includes the post-processing control section 411 of the post-processing device 20, the post-processing member detector 412 of the post-processing device 20, the controller 111 of the image forming apparatus 100, and a storage section 141 of the image forming apparatus 100. The controller 111 of the image forming apparatus 100 controls the registration information on post-processing functions in the image forming apparatus 100. For example, the controller 111 includes an operation control section 112, an apparatus management control section 113, and a job management control section 114.

The post-processing member detector 412 of the post-processing device 20 detects the information indicating the post-processing member installation condition such as the type, function and slot position of a post-processing member installed in the post-processing device 20 (hereinafter, installation information) according to information from a detection switch, etc. and sends the installation information to the post-processing control section 411. For example, when a post-processing member is installed in one of the post-processing units 300, 400, 500, 600, 700, and 800, the post-processing device 20 supplies power to the installed post-processing member. Then, the information on the type or function of the post-processing member is sent from a chip or the like mounted on the post-processing member to the post-processing member detector 412 of the post-processing device 20.

The post-processing control section 411 of the post-processing device 20 acquires the post-processing member installation information from the post-processing member detector 412 and sends the acquired post-processing member installation information to the image forming apparatus 100 through the communication I/F 45.

The operation control section 112 controls the display screen of the operation display unit 110 of the image forming apparatus 100 and receives an operation instruction which the user gives on the operation display unit 110. Also, the operation control section 112 stores the information on the job set by the user through the operation display unit 110 and the post-processing function registration information in the storage section 141.

The job management control section 114 controls the start or stop of the job set by the user. Also, the job management control section 114 reads the information on the job set by the user from the storage section 141 to acquire the information on the post-processing functions to be performed for the job.

The apparatus management control section 113 acquires the post-processing member installation information from the post-processing control section 411 through the communication I/F 15. Then, it stores the acquired post-processing member installation information in the storage section 141. It also reads the post-processing member installation information stored in the storage section 141 and the registration information on the user-specified post-processing functions from the storage section 141. Furthermore, the apparatus management control section 113 receives the setting information on the post-processing functions to be performed for the job from the job management control section 114, compares the post-processing functions to be performed for the job with the installation information on the post-processing members, and determines whether the post-processing functions selected for the job can be performed or not.

(Registration of post-processing functions: Manual Registration)

Next, as an example that the information on post-processing functions selectable in setting a job is registered in the image forming apparatus 100, manual registration of selectable post-processing functions by the user will be explained. FIG. 8 is a functional block diagram for manual registration of selectable post-processing functions by the user.

In order for the user to register selectable post-processing functions manually, the operation control section 112 of the image forming apparatus 100 causes the operation display unit 110 to display a setting screen for the post-processing functions which can be registered by the operator (user). FIGS. 9 to 11 show an example of the setting screen for registration of post-processing functions displayed on the operation display unit 110. The setting screen shown in FIGS. 9 to 11 is an example of the setting screen which shows the post-processing functions of the multi-cutting machine as described above in reference to FIG. 5.

As shown in FIGS. 9 to 11, the setting screen lists the registrable post-processing members, each identified by type (Type). Preferably the setting screen lists all the post-processing members that can be installed (replaced) in the post-processing device 20 in a manner that they can be each identified by type or function. FIGS. 9 to 11 show post-processing members of Type A to Type F as the types of post-processing members. FIG. 9 shows the case that the user registers all the post-processing functions as selectable in setting a job. FIG. 10 shows the case that the user registers the post-processing functions of Type B and Type C as non-selectable. FIG. 11 shows the case that the user registers only the post-processing function of Type F as non-selectable.

The setting screen for registration of post-processing functions lists the types of post-processing members so that the user can specify a selectable post-processing function by the type of post-processing member in setting a job. FIGS. 9 to 11 show command buttons "REGISTER ON" and "REGISTER OFF" for each type of post-processing member. The user can select the "REGISTER ON" or "REGISTER OFF" command for each type of post-processing member and thus register the post-processing functions selectable in setting a job, in the image forming apparatus.

The operation control section 112 acquires the registration information on each type of post-processing member about whether to make it selectable or non-selectable according to the information on the selection of the "REGISTER ON" or "REGISTER OFF" command for each type of post-processing member. Then, the operation control section 112 stores the acquired registration information in the storage section 141.

In the example of the setting screen shown in FIG. 9, the "REGISTER ON" command is selected (highlighted by dots) for all the types of post-processing members (Type A to Type F). Therefore, in this example, the registration information that all the post-processing functions are selectable in setting a job is stored in the storage section 141.

In the example of the setting screen shown in FIG. 10, the "REGISTER ON" command is selected for Type A and Type D to Type F and the "REGISTER OFF" command is selected for Type B and Type C. Therefore, in this example, the storage section 141 stores the registration information that the post-processing functions of Type A and Type D to Type F are selectable in setting a job and the post-processing functions of Type B and Type C are not selectable.

In the example of the setting screen shown in FIG. 11, the "REGISTER ON" command is selected for Type A to Type E and the "REGISTER OFF" command is selected for Type F. Therefore, in this example, the storage section 141 stores the registration information that the post-processing functions of Type A to Type E are selectable in setting a job and the post-processing function of Type F is not selectable.

It is preferable that in the initial state of the image forming apparatus 100, the setting screen for registration of post-processing functions to be shown on the operation display unit 110 should list all types of post-processing members that can be installed in the post-processing device 20. If the post-processing members which can be installed are changed due to change in the specification of the post-processing device 20 or another reason, it is preferable to update the list shown on the setting screen according to the change in the specification.

In the above case that the user manually registers selectable post-processing functions, whether or not to register a post-processing function (ON/OFF) need not depend on whether the corresponding post-processing member is actually installed in the post-processing device 20 or not. Regardless of the post-processing members installed in the post-processing device 20, the user can register a selectable post-processing function as desired. For example, regarding the post-processing member not possessed by the user, the "RGISTER OFF" is selected so that the post-processing function which uses that post-processing member cannot be selected. On the other hand, regarding the post-processing member not installed in the post-processing device 20 but possessed by the user, the "RGISTER ON" may be selected to make it usable by replacement or installation so that the post-processing function which uses that post-processing member can be selected in setting a job. Thus, when the user manually registers selectable post-processing functions, the user can arbitrarily select and register post-processing functions as selectable in setting a job.

In the above method for registering post-processing functions, each post-processing function is registered according to the information on the type of the corresponding post-processing member. However, each post-processing function may be registered according to the information on the function of the corresponding post-processing member instead of the information on the type of the post-processing member. The information required for registration is not limited as far as it enables the image forming apparatus 100 to identify a post-processing function.

(Registration of Post-Processing Functions: Automatic Registration)

Figure 12:
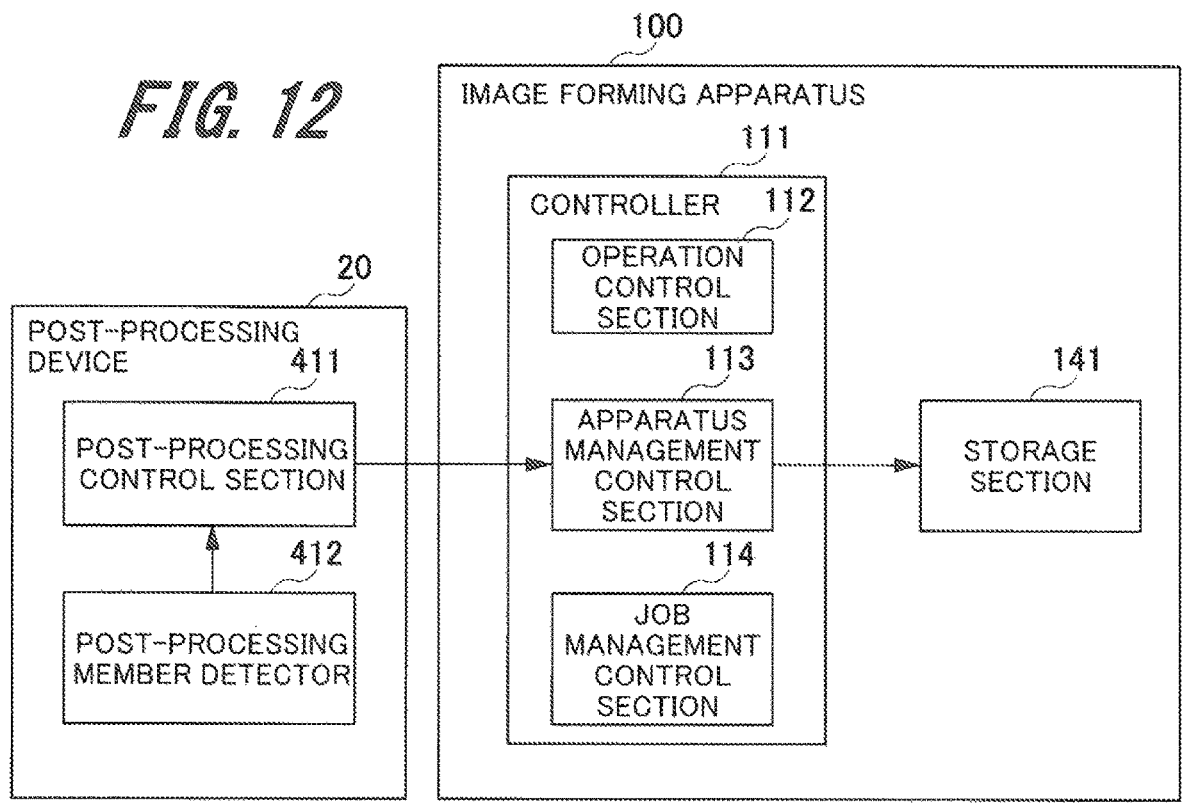
FIG. 12 is a functional block diagram for the image forming apparatus to register selectable post-processing functions according to a record.

Next, as another example that post-processing functions selectable for the user in setting a job are registered in the image forming apparatus 100, an explanation will be given of the process in which the image forming apparatus 100 automatically registers selectable post-processing functions according to the record of the post-processing members installed in the post-processing device 20. FIG. 12 is a functional block diagram for the image forming apparatus 100 to register selectable post-processing functions according to a record.

When a post-processing member is installed in or removed from one of the slots of the post-processing device 20, the post-processing member detector 412 detects the information on the post-processing member installed in or removed from the slot, including the type, function, and slot position and sends the information to the post-processing control section 411. The post-processing control section 411 acquires the installation information including the type, function and slot position of the post-processing member and whether it has been installed or removed, according to the information from the post-processing member detector 412 and sends the acquired installation information on the post-processing member to the apparatus management control section 113 of the image forming apparatus 100. The apparatus management control section 113 stores the information on the post-processing member including the type, function and slot position of the post-processing member in the storage section 141 according to the received installation information on the post-processing member.

For example, if all the types of post-processing members (Type A to Type F) shown in FIG. 5 have been installed in the post-processing device 20 (case shown in FIG. 9), the post-processing member detector 412 detects that the post-processing members of Type A to Type F have been installed, and sends the installation information on Type A to Type F to the post-processing control section 411. Then, the post-processing control section 411 sends the installation information on Type A to Type F to the apparatus management control section 113. The apparatus management control section 113 stores the post-processing function registration information in the storage section 141 according to the received installation information on Type A to Type F so that the post-processing functions of Type A to Type F are selectable. Thus, like the case shown in FIG. 9, the post-processing function registration information is registered in the image forming apparatus 100 so that the post-processing functions of Type A to Type F are all selectable in setting a job.

Similarly, if the post-processing members of Type A and Type D to Type F have been installed in the post-processing device 20 (case shown in FIG. 10), the post-processing member detector 412 detects the installation of the post-processing members of Type A and Type D to Type F and the post-processing control section 411 sends the post-processing member installation information to the apparatus management control section 113. Then, the apparatus management control section 113 stores the registration information on Type A and Type D to Type F in the storage section and thereby, like the case in FIG. 10, the post-processing function registration information is registered in the image forming apparatus 100 so that the post-processing functions of Type A and Type D to Type F are selectable in setting a job.

If the post-processing members of Type A to Type E have been installed (case shown in FIG. 11), the post-processing member detector 412 detects the installation of the post-processing members of Type A to Type E and the post-processing control section 411 sends the post-processing member installation information to the apparatus management control section 113. Then, the apparatus management control section 113 stores the registration information on Type A to Type E in the storage section and thereby, like the case in FIG. 11, the post-processing function registration information is registered in the image forming apparatus 100 so that the post-processing functions of Type A to Type E are selectable in setting a job.

Even if a post-processing member is removed from a slot, the post-processing member detector 412 detects the information on the removed post-processing member. Then, the post-processing member detector 412 sends the installation information on the removed post-processing member to the post-processing control section 411. The post-processing control section 411 sends the received information on the removed post-processing member to the apparatus management control section 113 of the image forming apparatus 100. At this time, the apparatus management control section 113 does not change the post-processing function registration information previously stored in the storage section 141. In other words, regarding a post-processing function registered as selectable in setting a job, even if the corresponding post-processing member is removed, the registration information is not changed to make the function non-selectable for a job, but the function remains selectable for a job.

[Detection of Installation of a Post-Processing Member]

Figure 13:
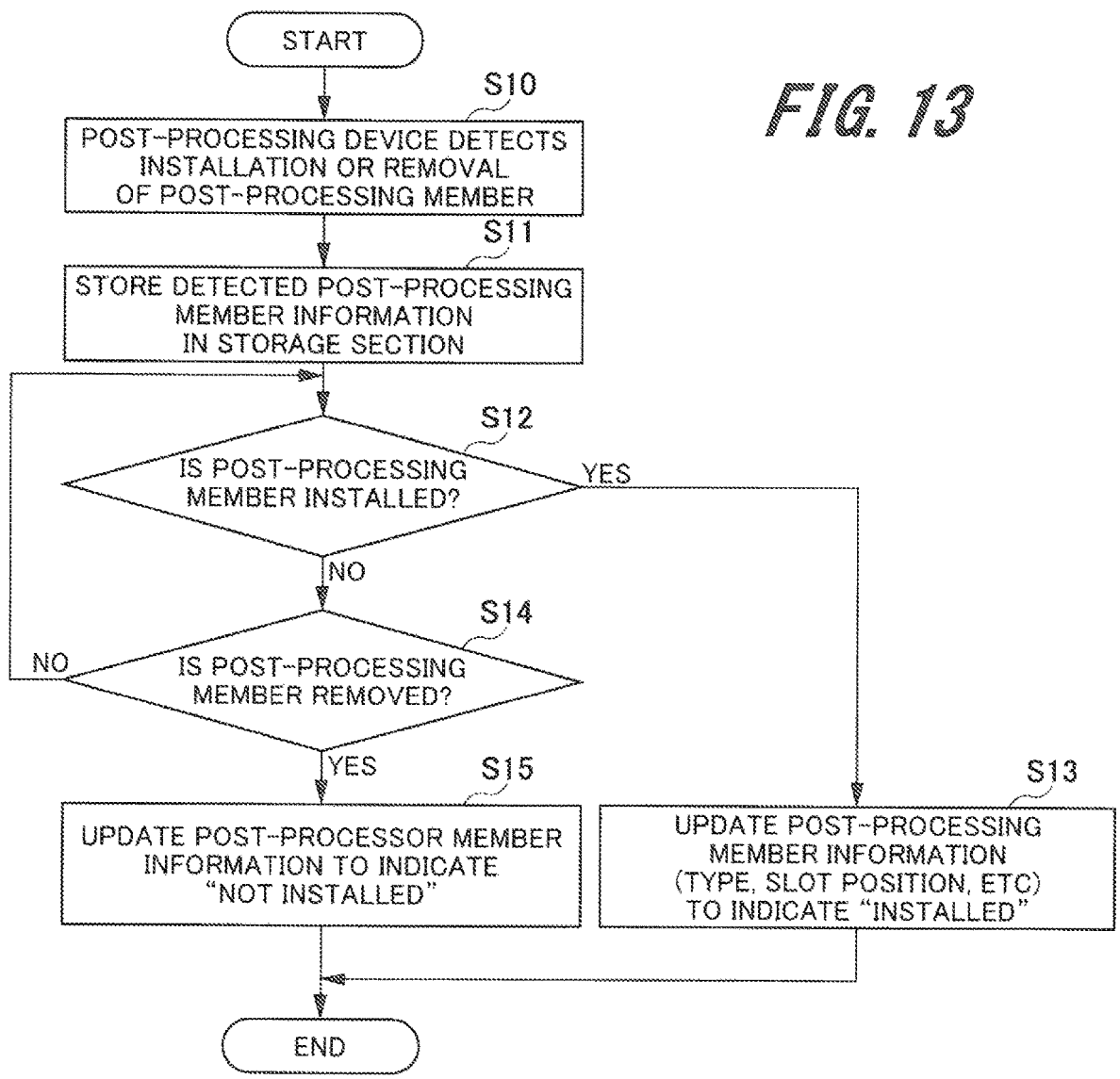
FIG. 13 is a flowchart which shows the method by which the image forming apparatus detects the installation or removal of a post-processing member in the post-processing device.

Next, the method by which the image forming apparatus 100 in the image forming system 10 detects the installation or removal of a post-processing member in the post-processing device 20 will be explained. FIG. 13 is a flowchart which shows the method by which the image forming apparatus 100 detects the installation or removal of a post-processing member in the post-processing device 20. The sequence shown in this flowchart is performed by the CPU 41 executing the program stored in the ROM 42.

First, the post-processing device 20 detects that a post-processing member has been installed in, or removed from, a slot (Step S10). Specifically, when the combination of post-processing members installed in the slots of the post-processing device 20 has changed as a result of installation or removal of a post-processing member, the post-processing member detector 412 acquires the installation information on the post-processing member in the slot concerned. Then, the post-processing control section 411 sends the installation information on the post-processing member to the apparatus management control section 113 and the apparatus management control section 113 stores the installation information on the post-processing member in the storage section 141 (Step S11).

Then, the apparatus management control section 113 determines whether the post-processing member installation information indicates the installation of the post-processing member in the post-processing device 20 or not (Step S12). If the post-processing member installation information indicates the installation of the post-processing member in the post-processing device 20 (YES at Step S12), the information on the post-processing member as stored in the storage section 141 (type, slot position, etc.) is updated so as to indicate that the post-processing member is installed (Step S13). After the information on the post-processing member is updated, the sequence shown in the flowchart is ended.

If the installation information on the post-processing member does not indicate that the post-processing member is installed in the post-processing device 20 (NO at Step S12), a determination is made as to whether the information indicates the removal of the post-processing member from the post-processing device 20 (Step S14). If the installation information on the post-processing member does not indicate the removal of the post-processing member from the post-processing device 20 (NO at Step S14), the determination at Step S12 is made again.

If the post-processing member installation information indicates the removal of the post-processing member from the post-processing device 20 (YES at Step S14), the information on the post-processing member as stored in the storage section 141 is updated so as to indicate that the post-processing member is not installed (Step S15). After the installation information on the post-processing member is updated, the sequence shown in the flowchart is ended.

[Setting a Job]

Figure 14:
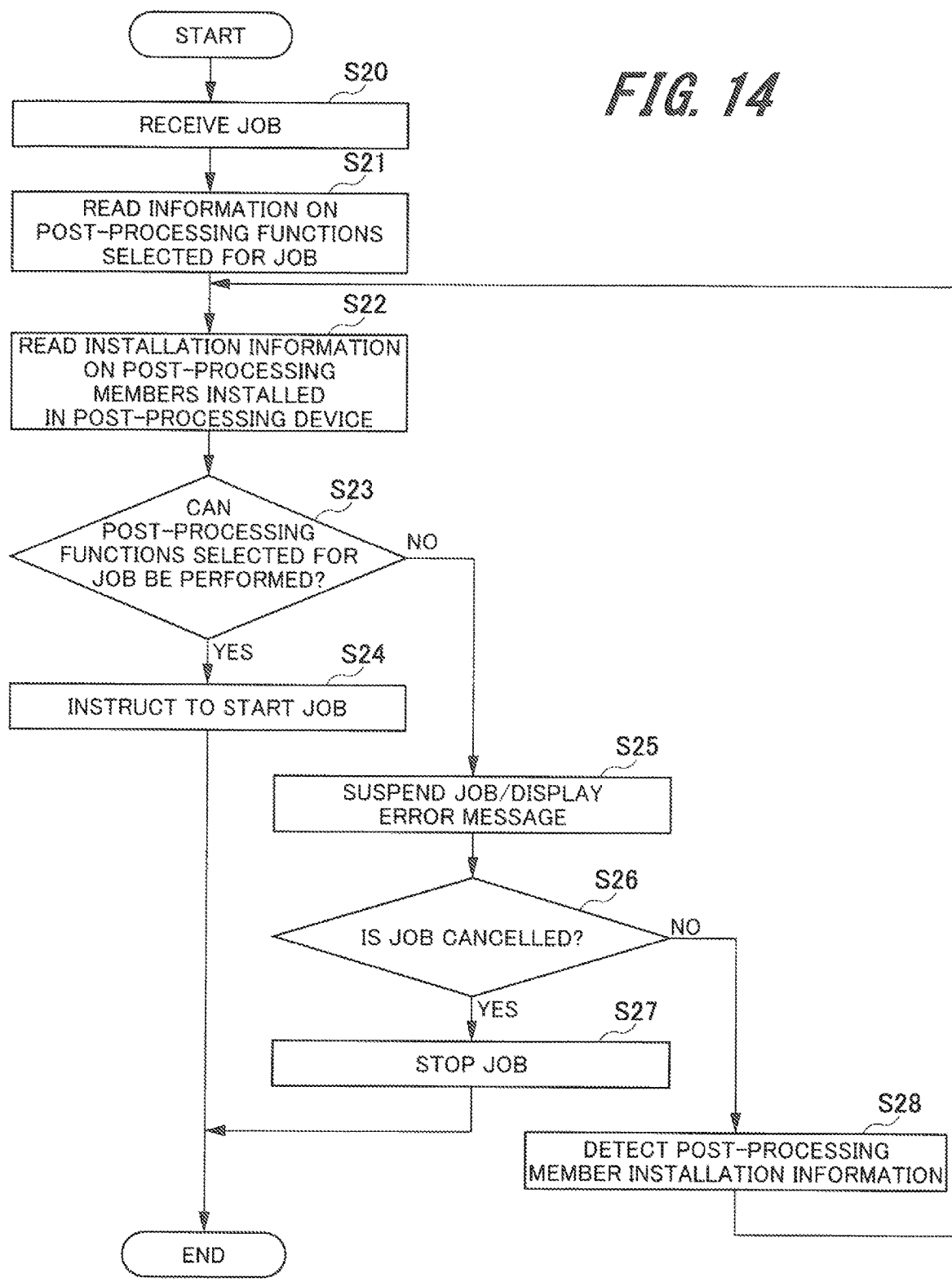
FIG. 14 is a flowchart which shows the sequence of dealing with a job in the image forming system.
Figure 15:
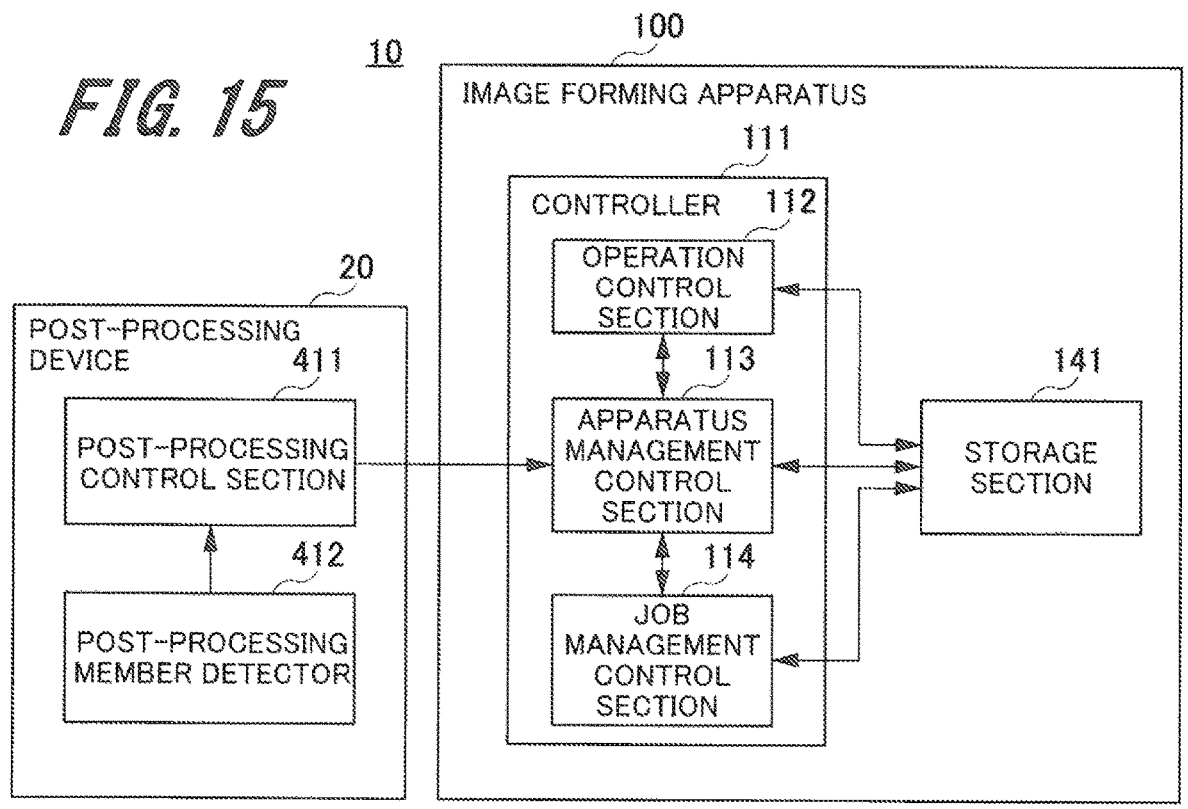
FIG. 15 is a functional block diagram of the image forming system for setting a job.

Next, how the image forming apparatus 100 in the image forming system 10 deals with the post-processing functions selected by the user to set a job will be explained. FIG. 14 is a flowchart which shows the sequence of dealing with the job in the image forming system. FIG. 15 is a functional block diagram of the image forming system 10 for setting a job.

First, the operation control section 112 receives the job set by the user using the operation display unit 110 of the image forming apparatus 100, which includes the selection of post-processing functions (Step S20). Furthermore, the operation control section 112 stores the received job setting information in the storage section 141.

In setting the job, the operation control section 112 of the image forming apparatus 100 reads the post-processing function registration information from the storage section 141 and the user selects the post-processing functions to be performed, on the job setting screen displayed on the operation display unit 110 according to the registration information. FIGS. 16 to 18 show examples of the job setting screen which is displayed on the operation display unit 110. FIGS. 16 to 18 show the setting screens which correspond to the registration information illustrated in FIGS. 9 to 11, respectively. The multi-cutting machine function setting screen in FIG. 16 corresponds to the registration information in FIG. 9, indicating that all the post-processing functions of Types A to F are selectable. The multi-cutting machine function setting screen in FIG. 17 corresponds to the registration information in FIG. 10, indicating that the post-processing functions of Type A and Type D to Type F are selectable and the post-processing function of Type B (CD perforating) and the post-processing function of Type C (FD perforating) are not selectable (grayed out). The multi-cutting machine function setting screen in FIG. 18 corresponds to the registration information in FIG. 11, indicating that the post-processing functions of Type A to Type E are selectable and the post-processing function of Type F (creasing) is not selectable (grayed out).

Then, the apparatus management control section 113 reads the job setting information from the storage section 141 (Step S21). As the apparatus management control section 113 reads the job setting information, it acquires the information for performing the post-processing functions, which includes the post-processing functions to be performed for the job, the post-processing members for performing the post-processing functions, and the order of performance of the post-processing functions.

Furthermore, the apparatus management control section 113 reads the post-processing member installation information stored in the storage section 141 (Step S22). As the apparatus management control section 113 reads the post-processing member installation information, it acquires the installation information on the post-processing members installed in the units of the post-processing device 20 (function, slot position, etc.).

Then, the apparatus management control section 113 determines whether the post-processing functions to be performed for the job according to the job setting information can be performed with the post-processing members currently installed in the post-processing device 20 or not (Step S23). The apparatus management control section 113 compares the acquired information for performing the post-processing functions with the post-processing member installation information and determines whether all the post-processing functions selected for the job can be performed by the current composition of the post-processing device 20 or not. For example, cases that the post-processing functions selected for the job cannot be performed include a case that a post-processing member required to perform a post-processing function is not installed and a case that the post-processing functions cannot be performed in the current order of arrangement of post-processing members.

If all the post-processing functions selected for the job can be performed (YES at Step S23), the apparatus management control section 113 instructs the job management control section 114 to start execution of the job (Step S24). The job management control section 114 reads the setting information for the job to be executed, from the storage section 141 and starts the execution of the job according to the instruction from the apparatus management control section 113. After the apparatus management control section 113 gives the instruction to the job management control section 114, the sequence shown in the flowchart is ended.

If the job setting information includes a post-processing function which cannot be performed (NO at S23), the apparatus management control section 113 instructs the job management control section 114 to suspend the start of the job and display an error message (Step S25). The operation control section 112 displays an error message on the operation display unit 110 according to the instruction from the apparatus management control section 113. The job management control section 114 suspends the start of the job according to the instruction from the apparatus management control section 113.

FIG. 19 and FIG. 20 show examples of error messages which are displayed on the operation display unit 110. FIG. 19 shows an example of the error message which corresponds to the registration information illustrated in FIG. 10. FIG. 20 shows an example of the error message which corresponds to the registration information illustrated in FIG. 11. Each of the error message examples shown in FIG. 19 and FIG. 20 includes Job NO (J4 or J5), combination of slots of the post-processing device (types, etc.), and a message. In the message, an instruction is given to install the post-processing members to perform the post-processing functions selected for the job, in the specified slots of the post-processing device 20, as shown in FIG. 19 and FIG. 20. Instead, an instruction may be given to change the slot positions for the post-processing members previously installed in the post-processing device 20 or change the order of arrangement of the post-processing members.

Next, the apparatus management control section 113 determines whether the job is cancelled or not during display of the error message on the operation display unit 110 (Step S26). The job may be cancelled in two ways: for example, the operation control section 112 accepts cancellation of the job by the user through the operation display unit 110 or the image forming apparatus 100 automatically cancels the job upon elapse of a specified time after the error message is displayed.

If the job is cancelled during display of the error message (YES at Step S26), the apparatus management control section 113 instructs the job management control section 114 to stop the job (Step S27). After the job management control section 114 stops the job according to the instruction from the operation control section 112, the sequence shown in the flowchart is ended.

If the job is not cancelled during display of the error message (NO at Step S26), the apparatus management control section 113 detects the post-processing member installation information (Step S28). The post-processing member installation information is detected by the apparatus management control section 113 as follows: for example, when the user installs post-processing members (change of post-processing members, change of slot positions, etc.) according to an error message, the post-processing member detector 412 detects the information on the installed post-processing members and the post-processing control section 411 sends the information to the apparatus management control section 113. After the apparatus management control section 113 detects the post-processing member installation information, it repeats Step S22. After Step S24 or Step S27 is carried out, the sequence shown in the flowchart is ended.

According to the image forming system 10 described so far, the user can arbitrarily register the post-processing functions selectable for the user in setting a job, regardless of the post-processing members installed in the image forming apparatus 100. In addition, even if selectable post-processing functions have been already registered, the user can change the registration arbitrarily. Therefore, in setting the job, only the post-processing functions required for the user are selectable and the post-processing functions not required for the user are not displayed. Consequently, in the image forming system 10, the unrequired function items are not displayed at the time of setting the job, thereby leading to improvement in operability and reduction of operational errors.

Although the embodiment of the present invention has been described and illustrated in detail, the present invention is not limited to the above embodiment. The invention may be embodied in other various ways without departing from the scope of the present invention. The scope of the present invention should be interpreted by terms of the appended claims.

REFERENCE SIGNS LIST

10 . . . image forming system
11, 41 . . . CPU,
12, 42 . . . ROM,
13, 43 . . . RAM,
14, 141 . . . storage section,
15, 45 . . . communication I/F,
20 . . . post-processing device,
30 . . . multi-cutting machine,
35 . . . card tray,
37 . . . transportation path switcher,
44 . . . storage,
100 . . . image forming apparatus,
110 . . . operation display unit,
111 . . . controller,
112 . . . operation control section,
113 . . . apparatus management control section,
114 . . . job management control section,
140 . . . image forming section,
170, 270 . . . paper feed section,
180 . . . fixing section,
200 . . . large-capacity paper feed unit,
300, 400, 500, 600, 700, 800 . . . post-processing unit,
411 . . . post-processing control section,
412 . . . post-processing member detector,
D1 . . . paper transportation direction

What is claimed is:

1. An image forming apparatus comprising:
a display section;
an operation section;
a controller;
a storage section, and
an image forming section for forming an image on paper, the controller comprising:
an operation control section;
a job management control section; and
an apparatus management control section, wherein
the operation control section receives, from the operation section, registration of information on a post-processing member to be used in a post-processing device to perform post-processing for the paper with an image formed thereon, stores the registration information on the post-processing member in the storage section, and displays a job setting screen with a post-processing function selectable in setting a job according to the registration information on the display section,
the job management control section acquires setting information which indicates the post-processing function selected on the job setting screen displayed on the display section for the job,
the apparatus management control section compares the setting information acquired by the job management control section with installation information indicating an installation condition of the post-processing member and determines whether the post-processing function selected for the job can be performed or not, and
if the post-processing function selected for the job cannot be performed, the apparatus management control section instructs the operation control section to display an error message and instructs the job management control section to suspend start of the job, the error message including an instruction to install a post-processing member to perform the selected post-processing function, an instruction to change a slot position of the post-processing member installed in the post-processing device, or an instruction to change an order of arrangement of post-processing members.

2. The image forming apparatus according to claim 1, wherein the controller includes an apparatus management control section which receives, from the post-processing device, the installation information and stores the installation information in the storage section.

3. The image forming apparatus according to claim 2, wherein the operation control section updates the registration information on the post-processing member according to a record of the installation information stored in the storage section.

4. The image forming apparatus according to claim 1, wherein the registration information on the post-processing member includes at least one of type information of the post-processing member and function information of the post-processing member.

5. The image forming apparatus according to claim 1, wherein the apparatus management control section detects the installation information on the post-processing member while the error message is displayed.

6. The image forming apparatus according to claim 1, wherein the post-processing function can be registered as selectable in setting a job when the post-processing member that performs the post-processing function is not installed in the post-processing device.

7. The image forming apparatus according to claim 1, wherein the post-processing function selectable in setting a job is registerable manually by a user using a registration setting screen listing all registerable post-processing members that are installable.

8. The image forming apparatus according to claim 1, wherein the installation information indicates an installed slot of a plurality of slots in the post-processing device in which the post-processing member is installed.

9. An image forming system comprising:
an image forming apparatus; and
a post-processing device for performing post-processing for paper,
the image forming apparatus comprising:
a display section;
an operation section;
a controller;
a storage section, and
an image forming section for forming an image on paper,
the controller comprising:
an operation control section;
a job management control section; and
an apparatus management control section, wherein
the operation control section receives, from the operation section, registration of information on a post-processing member to be used in the post-processing device, stores the registration information on the post-processing member in the storage section, and displays a job setting screen with a post-processing function selectable in setting a job on the display section according to the registration information,
the job management control section acquires setting information which indicates the post-processing function selected on the job setting screen displayed on the display section for the job,
the apparatus management control section compares the setting information acquired by the job management control section with the installation information on the post-processing member stored in the storage section and determines whether the post-processing function selected for the job can be performed or not, and
if the post-processing function selected for the job cannot be performed, the apparatus management control section instructs the operation control section to display an error message and instructs the job management control section to suspend start of the job, the error message including an instruction to install a post-processing member to perform the selected post-processing function, an instruction to change a slot position of the post-processing member installed in the post-processinq device, or an instruction to change an order of arrangement of post-processinq members.

10. The image forming system according to claim 9, wherein the controller includes an apparatus management control section which receives, from the post-processing device, installation information indicating an installation condition of the post-processing member and stores the installation information in the storage section.

11. The image forming system according to claim 10, wherein
the post-processing device comprises a post-processing control section and a post-processing member detector, and
the post-processing member detector detects the installation information on the post-processing member installed in the post-processing device and the post-processing control section sends the installation information to the apparatus management control section.

12. An image forming system comprising:
an image forming apparatus; and
a post-processing device for performing post-processing for paper, the post-processing device having a plurality of slots,
the image forming apparatus comprising:
a display section;
an operation section;
a controller;
a storage section, and
an image forming section for forming an image on paper,
the controller comprising:
an operation control section;
a job management control section; and
an apparatus management control section, wherein
the operation control section receives, from the operation section, registration of information on at least one post-processing member to be used in the post-processing device, stores the registration information on the post-processing member in the storage section, and displays a job setting screen with a post-processing function selectable in setting a job on the display section according to the registration information,
the job management control section acquires setting information which indicates the post-processing function selected on the job setting screen displayed on the display section for the job,
the apparatus management control section compares the setting information acquired by the job management control section with installation information indicating in which of the slots each of the at least one post-processing member is installed, and determines whether the post-processing function selected for the job can be performed or not, and
if the post-processing function selected for the job cannot be performed, the apparatus management control section instructs the operation control section to display an error message and instructs the job management control section to suspend start of the job, the error message including an instruction to install an additional post-processing member to perform the selected post-processing function in one of the plurality of slots, an instruction to change a slot position of the post-processing member installed in the post-processing device, or an instruction to change an order of arrangement of post-processing members.

* * * * *